Feb. 9, 1971  J. E. CREAGER ET AL  3,562,799
TURN SIGNAL SYSTEM WITH AUTOMATIC DISTANCE CANCELLATION
Filed Dec. 5, 1968  2 Sheets-Sheet 2

INVENTORS.
John E. Creager, &
BY George B. Hardenbrook, Jr.
Albert F. Duke
ATTORNEY

United States Patent Office 3,562,799
Patented Feb. 9, 1971

3,562,799
TURN SIGNAL SYSTEM WITH AUTOMATIC DISTANCE CANCELLATION
John E. Creager, Fenton, and George B. Hardenbrook, Jr., Flint, Mich., assignors to General Motors Corporation, Detroit, Mich., a corporation of Delaware
Filed Dec. 5, 1968, Ser. No. 781,572
Int. Cl. B60g 1/24, 1/38
U.S. Cl. 340—56                                      3 Claims

ABSTRACT OF THE DISCLOSURE

A turn signal system is disclosed which includes a turn signal switch for controlling actuation of one or both armatures of a dual armature relay to energize the appropriate turn signal lamps. One of the relay armatures carries a switch operating gear which is adapted to be coupled to the odometer drive mechanism of the vehicle to open the circuit to the relay and denergize the signal lamps after the vehicle has traveled a predetermined distance.

---

This invention relates to signaling systems for motor vehicles and more particularly to a vehicle signaling system wherein signal lamps are energized under the vehicle operator's control for indicating an impending change of vehicle direction and are automatically deenergized after a predetermined distance of vehicle travel.

Motor vehicles are presently provided with signal lamps mounted at the front and rear of the vehicle on the left and right hand sides for indicating an intended turn and for other purposes. Usually a turn signal switch mounted at the steering column and operable by the vehicle driver is adapted to selectively close a circuit between a flasher and the appropriate signal lamps. Means are usually provided for returning the turn signal switch to a neutral or open circuit position in response to rotation of the steering shaft after completion of the turn. Unless the steering shaft is rotated a predetermined amount, however, cancellation of the turn signal indication does not occur and consequently at times the signal system remains energized after completion of a turn or other vehicle maneuver not involving substantial rotation of the steering shaft. When this occurs, the signal, of course, does not properly indicate the intentions of the vehicle driver. To overcome this problem, various systems have been proposed wherein the turn signal switch is returned to a neutral position after a predetermined interval of time or distance of travel of the vehicle. Generally speaking, these systems involve a turn signal switch which is biased to a neutral position and which is maintained in a turn signaling position by electromagnetic detent means which are deenergized after a predetermined interval of time or distance traveled. Where the detent means are responsive to distance traveled, an additional electromagnetic means are utilized to couple a rotatable element to the odometer gear train and the rotation thus incurred is utilized to open the circuit to the detent means thus permitting the turn signal switch to return to the neutral position after the vehicle has traveled a fixed distance. Such systems have not proven entirely satisfactory because of their complexity and cost.

With the foregoing in mind, it is an object of the present invention to provide a direction signaling system wherein a single relay structure is operative in response to turn signal switch operation to control the energization of the appropriate turn signal lamps as well as deenergize the lamps after a predetermined distance of travel of the vehicle.

It is another object of the present invention to provide a turn signal system which incorporates a dual armature relay wherein one of the armatures is actuated in one position of the turn signal switch to energize one set of turn signal lamps and both armatures are energized in a second position of the turn signal switch to energize another set of turn signal lamps and wherein one of the relay armatures carries an actuator gear adapted to mesh with the odometer gear train of the vehicle and to subsequently break the energizing circuit of the relay to thereby extinguish the signal lamps.

These and other objects of the present invention will be more fully appreciated by a reading of the following detailed description in conjunction with the drawings in which.

Figure 1:
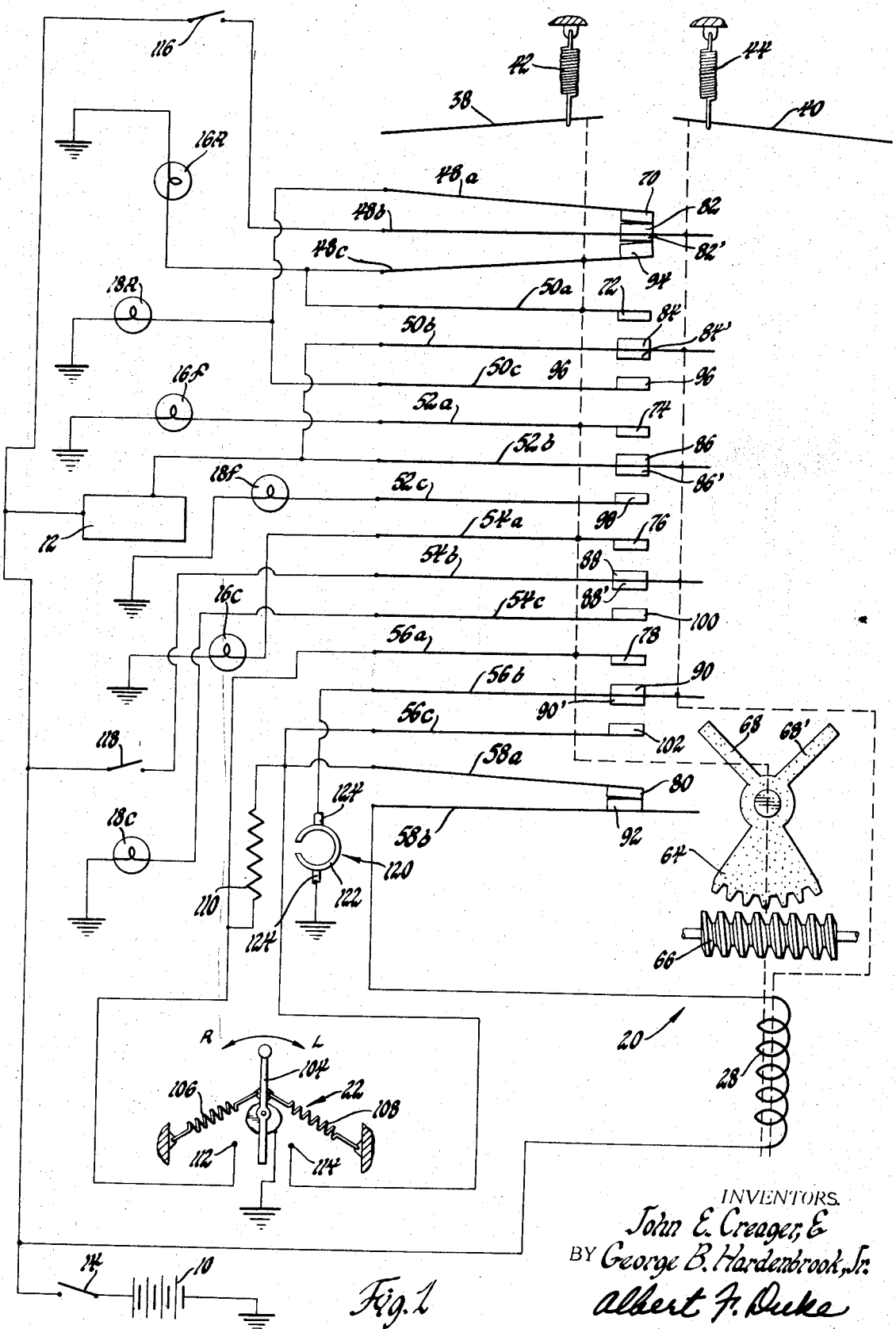
FIG. 1 is a schematic diagram of the turn signal system of the present invention.

Referring now to the drawings and initially to FIG. 1, the turn signal system of the present invention comprises a source of direct current 10 which is preferably the vehicle battery. One terminal of the battery 10 is grounded while the other terminal is connected to a conventional flasher 12 through the vehicle ignition switch 14. Left front and rear signal lamps 16F and 16R and right front and rear signals lamps 18F and 18R are provided on the vehicle for signaling the appropriate left or right turn. Left and right cornering lamps 16C and 18C are provided for operation at night in conjunction with the left signal lamps 16F, 16R or right signal lamps 18F, 18R to illuminate the direction of the intended turn. The lamps 16F, 16R, 16C and 18F, 18R, 18C are energizable through a dual armature relay generally designated 20 under the control of a turn signal switch generally designated 22.

Figure 2:
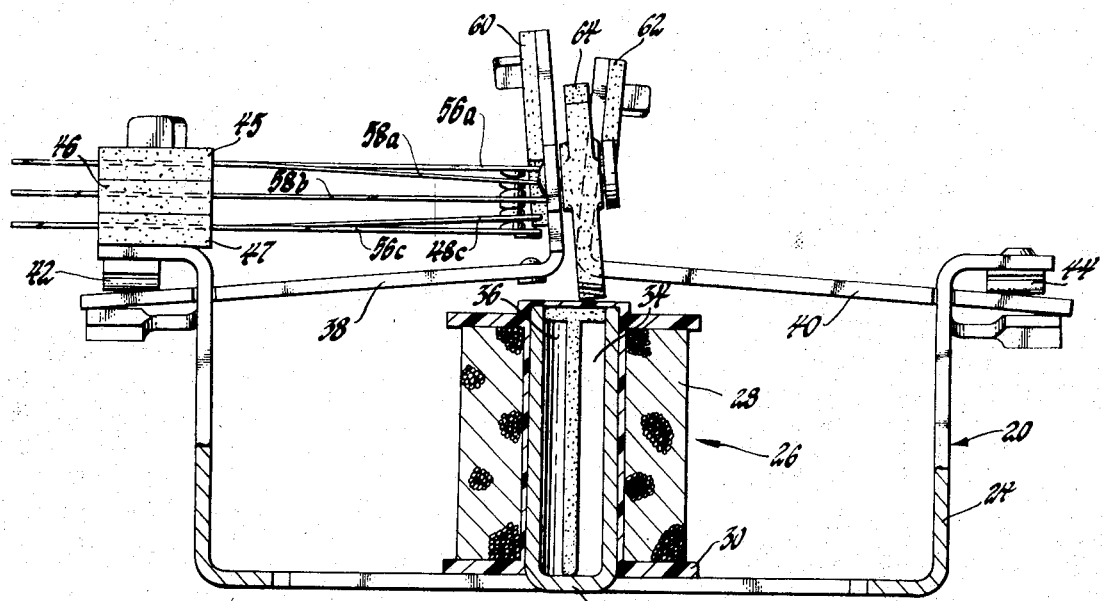
FIG. 2 is a view of the dual armature relay used in the present invention and shown partly in elevation and partly in section.
Figure 3:
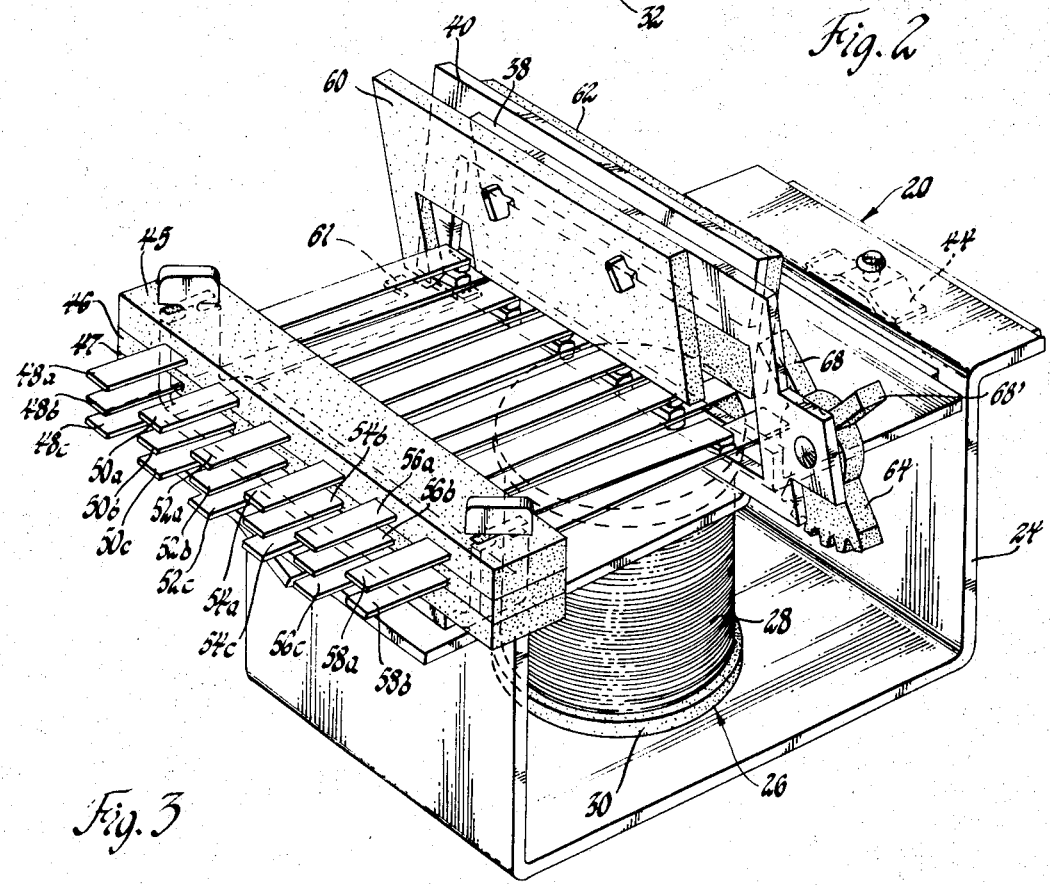
FIG. 3 is an isometric view of the dual armature relay used in the present invention.

Referring to FIGS. 2 and 3, the dual armature relay 20 comprises a generally U shaped steel frame 24. The frame 24 supports a coil assembly generally designated 26 which includes a coil 28 wound on a spool 30 formed of an insulating material. The spool 30 receives a split cylindrical core 32 formed integrally with the frame 24 and having core portions 34 and 36 forming two relatively poor magnetic paths. The sides of the frame 24 pivotally support a pair of L shaped armatures 38 and 40 which are biased away from the core 32 by springs 42 and 44, respectively. The biasing force applied to the spring 44 is variable and is adjusted so that a greater biasing force is applied to the armature 40 than to the armature 38. Accordingly, a greater magnetic force is required to actuate the armature 40 than is required to actuate the armature 38. It will be understood that other measures may be taken to set this requirement such as, for example, making the air gap between the armature 40 and the core 32 greater than that between the armature 38 and the core 32. Alternatively, a combination of air gap spacing and biasing force may be employed to insure that differing magnetic force levels are required to actuate the armatures 38 and 40.

As will be explained hereinafter, the magnitude of the current flow through the coil 28 is adjustable between two distinct levels. At the lower current level, the magnetic flux through the armature 38, the core portion 36 and the frame 24 is sufficient to attract the armature 38, whereas the flux through the armature 40, the core portion 34 and the frame 24 is insufficient to attract the armature 40. At the higher level of current flow, the flux established in the two magnetic paths through the armatures 38 and 40 is sufficient to attract both armatures.

The frame 24 supports insulator blocks 45, 46 and 47 which in turn supports at one end upper spring arms 48a–56a, center spring arms 48b–56b and lower spring arms 48c–56c, respectively. In addition, blocks 46 and 47 support at one end a pair of spring arms 58a and 58b, respectively.

The armature 38 carries an insulator block 60 which, upon actuation of the armature 38, engages a tab 61 on lower spring arm 48c and also engages upper spring arms 50a–56a as indicated by the heavy dots in FIG. 1. The armature 40 carries an insulator block 62 which, upon actuation of the armature 40, engages the middle spring arms 48b–56b as indicated by the heavy dots in FIG. 1. The armature 38 also carries a nylon actuator gear 64 which is adapted to mesh with the vehicle odometer drive mechanism 66 (FIG. 1) when the coil winding 28 is energized. The actuator gear 64 normally assumes the position shown in FIG. 3 and includes a projection 68 adapted to engage the spring 58b after a predetermined rotation of the odometer drive mechanism 66. A second projection 68′ is provided to counterbalance the projection 68 so that the gear 64 will assume the position shown through the force of gravity. Alternatively, the gear 64 may be spring biased to the position shown.

Referring again to FIG. 1, the upper spring arms 48a–58a carry contacts 70–80. The middle spring arms 48b–56b carry double contacts 82, 82′–90, 90′, while the middle spring arm 58b carries a single contact 92. The lower springs arms 48c–56c carry contacts 94–102. The contacts 70, 82, 82′, 94 and 80, 92 are normally closed while the remaining contacts are normally open in the deactuated position of the relay 20.

The middle spring arm 48b is connected to the battery 10 through the ignition switch 14 and a brake pedal operated switch 116 while the upper and lower spring arms 48a and 48c are connected to the left and right rear signal lamps 16R, 18R. The middle spring arms 50b and 52b are connected to the output of the flasher 12. The upper and lower spring arms 50a and 50c are connected to the left and right rear lamps 16R and 18R, respectively, while the upper and lower spring arms 52a and 52c are connected to the front left and right signal lamps 16F and 18F, respectively. The middle spring arm 54b is connected to the battery 10 through the ignition switch 14 and a headlamp switch 118, while the upper and lower spring arms 54a and 54c are connected to the left and right cornering lamps 16C and 18C, respectively.

The turn signal switch 22 includes an operating lever 104 which is biased to a neutral position by a pair of springs 106 and 108. The operating lever 104 is adapted to energize the coil 28 in the left turn position by grounding the coil 28 through the contacts 80, 92, a current limiting resistor 110 and a contact 112. In the right turn position, the coil 28 is energized through the contacts 80, 92 by grounding the contact 114 thus bypassing the resistor 110.

The middle spring arm 56b is connected to ground through a slip ring assembly generally designated 120 which includes a movable conductive segment 122 and brushes 124. The assembly 120 provides a means for automatically cancelling the turn signal indication in response to steering wheel rotation. The segments 122 is rotatable with the steering wheel and in the normal straight ahead position of the steering wheel completes a circuit between the spring arm 56b and ground but upon approximately 90° of rotation in either direction of the steering wheel, this circuit is broken.

The contacts 78 and 102 on the upper and lower spring arms 56a and 56c are adapted to engage the contacts 90 or 90′, respectively, on the middle spring arms 56b to provide a holding circuit for the relay coil 28 through the slip ring assembly 120 in parallel with the turn signal switch 22 in the left and right turn signal positions, respectively.

The operation of this system is as follows: With the turn signal switch 22 in the neutral position as shown, and with the ignition switch 14 closed, actuation of the brake pedal switch 116 will energize the rear signal lamps 16R and 18R through the normally closed contacts 70, 82, 82′, 94. As long as the brake pedal switch 116 is closed, the rear lamps 16R and 18R will be constantly energized.

If the operator wishes to signal a left turn, the turn signal switch 22 is moved to momentarily ground the contact 112 which connects the coil 28 across the battery 10 through the normally closed contacts 80, 92 and the resistor 110. As mentioned above, this provides a first level of current flow through the relay coil 28 and develops a magnetic force sufficient to actuate the armature 38 which opens the contacts 82′, 94 and closes the contacts 72, 84; 74, 86; 76, 88; and 78, 90. Closure of the contacts 78, 90 provides a holding circuit for the coil 28 through the contacts 80, 92, the resistor 110 and the slip ring assembly 120 so that upon release of the turn signal lever 104 the relay coil 28 remains energized. In this condition the left front and rear signal lamps 16F, 16R are connected to the flasher 12 through the contacts 74, 86 and 72, 84, respectively. At the same time, the actuator gear 64 engages the odometer gear train 66 causing the actuator gear 64 to begin to rotate in a counterclockwise direction. The lamps 16F and 16R will now be flashed at a frequency determined by the flasher 12 and will continue to flash until one of two events takes place. Should the operator of the vehicle execute a turn requiring substantially 90° of rotation of the steering wheel, then the holding circuit for the coil 28 will be broken by the slip ring assembly 120 and the lamps will be deenergized. If cancellation does not occur as a result of a substantial turning motion of the vehicle, then upon a predetermined amount of travel of the vehicle the actuator gear 64 will rotate counterclockwise a sufficient amount for the projection 68 to open the contacts 80, 92 thus breaking the holding circuit to the coil 28 releasing the armature 38 and deenergizing the lamps 16F, 16R. If during a left turn the brakes are applied, the contact 116 will close thus connecting the right rear lamp 18R to the battery 10 through the contacts 70, 82. Consequently, the left front and rear lamps 16F and 16R will flash to indicate the intended turn while the right rear signal lamp 18R will be continuously energized to indicate an impending deceleration of the vehicle preparatory to making the turn.

If, instead, the operator wishes to indicate a right turn, the momentary grounding of the contact 114 energizes the coil 28 through the contacts 80, 92 bypassing the resistor 110. The increased level of current flow through the coil 28 causes both armatures 38 and 40 to be actuated. With both armatures 38 and 40 actuated, the contacts 70, 82 are opened while the contacts 82′, 94 remain closed. Also the contacts 72, 84; 74, 86; 76, 88 and 78, 90 remain open while the contacts 84′, 96; 86′, 98; 88′, 100 and 90′, 102 are closed. Under these conditions the right front and rear lamps 18F, 18R are connected to the flasher 12 through the contacts 86′, 98 and 84′, 96, respectively. If the brakes are applied during a right turn, the left rear lamp 16R will be continuously energized from the battery 10 through the brake pedal switch 116 and contacts 82′, 94. Cancellation of the right turn signal is accomplished through either the slip ring assembly 120 or through counterclockwise rotation of the actuator gear 64 in the same manner as previously described in connection with a left turn.

If the vehicle is being driven at night or at any time when the headlamp switch 118 is closed, actuation of the turn signal switch 22 to the left or right turn positions will respectively connect the left or right cornering lamps 16C or 18C, respectively, to the battery through the contacts 76, 88 or 88′, 100, respectively. This will provide a continuous illumination of the area in the direction of the turn to assist the driver in executing the turn.

It should be understood that the above description and drawings are presented as the prfeerred embodiment and are not intended as limitations since obvious modifications will occur to persons skilled in the art.

We claim:

1. A turn signal system for a motor vehicle comprising a source of direct current, flasher means connected to said source, relay means including a relay coil and a pair of armatures, one of said armatures being actuable in response to a first level of current flow through said relay coil, both of said armatures being actuable in response to a second higher level of current flow through said relay coil, circuit means including turn signal switch means actuable to establish one of said levels of current flow through said relay coil to signal a left turn and to establish the other of said levels of current flow through said relay coil to signal a right turn, left and right turn signal lamps, contact means operable by said armatures for connecting one of said signal lamps to said flasher means in response to actuation of one of said armatures and for connecting the other signal lamp to said flasher means in response to actuation of both of said armatures, gear means rotatable in response to movement of said vehicle, an actuator gear rotatably supported by said one of said armatures and adapted to be coupled to said gear means for rotation therewith upon actuation of said one of said armatures and contact means actuable by said actuator gear for deenergizing said coil upon a predetermined rotation of said actuator gear whereby the turn signal lamps are deenergized after the vehicle has travelled a predetermined distance.

2. A turn signal system for a motor vehicle comprising a source of direct current, flasher means connected to said source, relay means including a relay coil and a pair of armatures, said relay means including normally closed contact means connected in series with said relay coil, a current limiting resistor connected in series with said relay coil, turn signal switch means actuable to a first turn signaling position momentarily connecting said relay coil, said normally closed contact means and said current limiting resistor across said source to establish a first level of current flow through said relay coil, said turn signal switch means being actuable to a second turn signaling position shunting said current limiting resistor and momentarily connecting said relay coil and said normally closed contact means directly across said source to establish a second higher level of current flow through said relay coil, one of said armatures being actuable in response to said first level of current flow, both of said armatures being actuable in response to said second level of current flow, left and right turn signal lamps, contact means operable by said armatures for connecting one of said signal lamps to said flasher means in response to movement of said one of said armatures and for connecting the other signal lamp to said flasher means in response to movement of both of said armatures, said relay means including normally open contact means actuable by either of said armatures to complete a holding circuit for said relay coil in parallel with said turn signal switch means and in series with said normally closed contact means, said vehicle including gear means rotatable in response to movement of said vehicle, an actuator gear rotatably supported by said one of said armatures and adapted to be coupled to said gear means for rotation therewith upon actuation of said one of said armatures, said actuator gear including means for opening said normally closed contact means upon a predetermined rotation of said actuator gear to deenergize said relay coil.

3. A turn signal system for a motor vehicle comprising a source of direct current, an ignition switch connected in series with said source, a normally open brake pedal operated switch connected in series with said ignition switch, front and rear left and right turn signal lamps, relay means including a relay coil and a pair of armatures, one of said armatures being actuable in response to a first level of current flow through said relay coil, both of said armatures being actuable in response to a second higher level of current flow through said relay coil, said relay means including normally closed contact means connecting said rear signal lamps to said brake pedal operated switch, turn signal switch means normally biased to a neutral position and movable to left or right turn signaling position, said relay means including additional normally closed contact means, a current limiting resistor, said turn signal switch means being adapted to connect said relay coil across said source through said ignition switch, said additional normally closed contact means and said current limiting resistor in said left turn signaling position and to connect said relay coil across said source in parallel with said current limiting resistor in said right turn signaling position, flasher means connected in series with said ignition switch, said relay means including normally open contact means actuable by said armatures for connecting said left front and rear signal lamps to said flasher means in response to actuation of said one armature and for connecting said right front and rear signal lamps to said flasher means in response to actuation of both of said armatures, a headlamp switch connected in series with said ignition switch, left and right cornering lamps, said relay means including additional normally open contact means actuable by said armatures for connecting said left cornering lamp in series with said headlamp switch in response to actuation of said one of said armatures and for connecting said right cornering lamp in series with said headlamp switch in response to actuation of both of said armatures, normally closed steering wheel rotation responsive switch means, said relay means including further normally open contact means actuable in response to actuation of either said one of said armatures or both of said armatures to connect said steering wheel rotation responsive switch means in series with said additional normally closed contact means of said relay means to provide a holding circuit for said relay coil, said steering wheel rotation responsive switch means being adapted to open and deenergize said relay coil in response to a predetermined rotation of said steering wheel, said vehicle including gear means rotatable in response to movement of said vehicle, an actuator gear rotatably supported by said one of said armatures and adapted to be coupled to said gear means for rotation therewith upon actuation of said one of said armatures, said actuator gear including means for opening said additional normally closed contact means of said relay means upon a predetermined rotation of said actuator gear to deenergize said relay coil.

References Cited
UNITED STATES PATENTS

| | | | |
|---|---|---|---|
| 1,530,641 | 3/1925 | Bennett | 340—56 |
| 3,316,533 | 4/1967 | Kell | 340—56 |
| 3,333,241 | 7/1967 | Peterson | 340—55 |

DONALD J. YUSKO, Primary Examiner

K. N. LEIMER, Assistant Examiner

U.S. Cl. X.R.

240—8.24; 315—82; 340—67, 81